United States Patent [19]

Kobayashi

[11] 4,251,553

[45] Feb. 17, 1981

[54] SEASONED RICE ROLLED IN LAVER

[75] Inventor: Toshiaki Kobayashi, Tokyo, Japan

[73] Assignee: Kyotaru Co., Ltd., Tokyo, Japan

[21] Appl. No.: 7,565

[22] Filed: Jan. 29, 1979

[51] Int. Cl.³ .................. B65B 29/00; B65B 25/06; B65B 11/00; B65D 75/04

[52] U.S. Cl. ....................... 426/115; 53/461; 53/430; 206/492; 206/548; 229/87 F; 229/56; 426/120; 426/123; 426/410

[58] Field of Search ............. 426/106, 119, 120, 618, 426/627, 615, 643, 500–502, 115, 420, 112, 132, 389, 124, 123, 410, 90, 297, 274, 275, 128, 113, 394; 53/461, 430, 211, 465, 117, 118, 466, 214, 429; 206/492, 548; 229/87 A, 56, 87 F, 87 R, DIG. 13

[56] References Cited

U.S. PATENT DOCUMENTS

| | | | |
|---|---|---|---|
| 834,474 | 10/1906 | Jackson | 426/124 |
| 1,988,058 | 1/1935 | Traller | 426/128 |
| 2,214,917 | 9/1940 | Angell | 426/297 |
| 2,726,156 | 12/1955 | Armstrong | 426/132 |
| 2,745,753 | 5/1956 | Ayres | 426/132 |
| 2,830,910 | 4/1958 | Swanson | 426/115 |
| 3,031,309 | 4/1962 | Bugner et al. | 426/113 |
| 3,225,920 | 12/1965 | Reilly | 229/87 A |
| 3,361,576 | 1/1968 | Jacobson | 426/110 |
| 3,830,035 | 8/1974 | Hoover | 53/461 |
| 4,143,165 | 3/1979 | Daswick | 426/120 |
| 4,145,449 | 3/1979 | Nelham | 426/120 |

FOREIGN PATENT DOCUMENTS

| | | | |
|---|---|---|---|
| 479177 | 12/1951 | Canada | 426/120 |
| 121012 | 8/1971 | Denmark | 229/56 |
| 4134076 | 1/1970 | Japan | 426/412 |
| 45-35220 | 11/1970 | Japan | 426/106 |
| 761098 | 11/1956 | United Kingdom | 229/87 F |

*Primary Examiner*—Steven L. Weinstein
*Attorney, Agent, or Firm*—Peter L. Berger

[57] ABSTRACT

The present invention relates to production and packaging of seasoned rice rolled in laver. A laver is fixed on a long strip of packing sheet for blocking the moisture and seasoned rice of cylindrical shape is situated at the center of said packing sheet. The packing sheet is then folded back in order to pack the laver and the seasoned rice separately, preventing the direct contact of them. When eating, said seasoned rice is rolled on the laver by pulling one end of the packing sheet, stripping the seasoned rice which rolls over the laver on the packing sheet. Thus, the flavor of laver can be secured from damage by moisture of said seasoned rice even long after production. In addition, said seasoned rice rolled in laver can be packed surely and cleanly for selling at a drive-in store or at a station.

9 Claims, 4 Drawing Figures

SEASONED RICE ROLLED IN LAVER

BACKGROUND OF THE INVENTION

A. Field of the Invention

The present invention relates to production and packaging of seasoned rice rolled in laver, or more particularly, to seasoned rice rolled in laver which is produced by packing the laver and the seasoned rice separately by a packing sheet and the seasoned rice is rolled on the laver when stripping said packing sheet by rolling the seasoned rice on the laver.

B. Description of the Prior Art

Seasoned rice, so-called SUSHI, is a food which is produced by boiling rice, adding vinegar and ingredients such as vegetables or fish or shell-fish and forming them by hand into cylindrical shape. The seasoned rice substantially contains a proper amount of moisture and is held in a hand without a fork when eating it.

A laver is a food which is made by drying a water plant in a sheetlike form such as rectangular and its natural flavour, dried taste and good smell are desirable.

Seasoned rice rolled in laver, so-called NORIMAKI, is, as shown in FIG. 1, a portable food which is produced by covering the surface of said seasoned rice with the laver. Nutrition such as the carbohydrates of said seasoned rice and the flavour, dried taste of said laver, can be appreciated at once. Said seasoned rice rolled in laver is held in a hand when eating it in hiking or so on.

In recent years, the seasoned rice rolled in laver is massproduced in food industry and sold at drive-in store or at a station. Accordingly, many problems have arisen regarding the production and packaging of said seasoned rice rolled in laver. In the first place, the laver is kept covering the seasoned rice for a long while after produced in a central kitchen. Consequently, the laver becomes damp by the moisture of the seasoned rice and the flavour as well as the taste of it is easily damaged. In the second place, it is necessary to properly pack the seasoned rice rolled in laver in order to sell them at a store. If not properly packed, the dust sticks and the moisture of the seasoned rice get away. In the prior art, seasoned rice rolled in laver is merely packed with a plastic film and these problems are left behind.

SUMMARY OF THE INVENTION

The present invention aims at improvement for production and packaging of seasoned rice rolled in laver.

The fundamental novel feature of the present invention lies in that a laver is fixed on a long strip of packing sheet for blocking the moisture, seasoned rice of cylindrical shape situated at the center of said packing sheet. The packing sheet is then folded back in order to pack the laver and the seasoned rice separately, preventing the direct contact of them. When eating, said seasoned rice is combined with the laver by pulling one end of the packing sheet to strip the seasoned rice which rolls over the laver on the packing sheet.

The first object of the invention is to obtain seasoned rice rolled in laver whose flavour is not damaged by the moisture of the seasoned rice for a long while after production so as to taste the dried and good smelling laver.

The second object of the invention is to obtain seasoned rice rolled in laver which can be surely and cleanly packed in order to sell it at a drive-in store or at a station.

The above- and further objects and novel features of the invention will more fully appear from the following detailed description when the same is read in connection with the accompanying drawings. It is to be expressly understood, however, that the drawings are for purpose of illustration only and is not intended as a definition of the invention.

DETAILED DESCRIPTION OF PREFERRED EMBODIMENTS

The fundamental feature of the invention lies in that the seasoned rice and the laver are packed separately by the packing sheet and, when eating, both the seasoned rice and the laver are combined together to form the seasoned rice rolled in laver, getting rid of the packing sheet.

Namely, the laver is fixed on a long strip of packing sheet for blocking the moisture and the seasoned rice of cylindrical shape is situated at the center of said packing sheet. The packing sheet is then folded back to pack the laver and the seasoned rice separately, preventing the direct contact of them. When eating, said seasoned rice is combined with the laver by pulling one end of the packing sheet to get rid of it as well as to roll the seasoned rice on the laver. The feature of the invention will be described hereinunder with reference to the figures.

Figure 1:
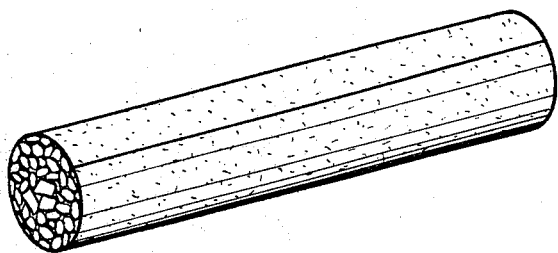
FIG. 1 is a perspective view of seasoned rice rolled in laver.
Figure 2:
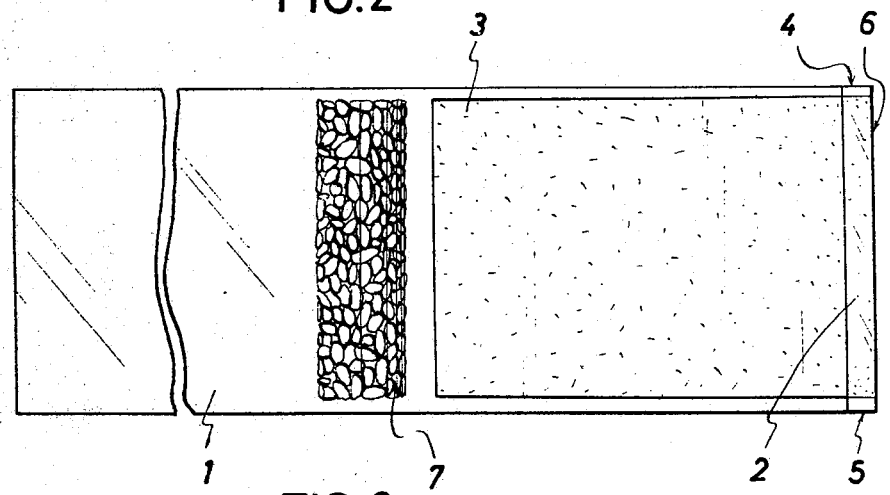
FIG. 2 is a plan view illustrating the process of packing the seasoned rice rolled in laver according to the present invention.

In FIG. 2, numeral 1 indicates a packing sheet for blocking the moisture or dust. Said packing sheet 1 is made of a long strip of plastic film such as nylon, cellophane or polypropylene. Said packing sheet 1 may be transparent or a print sheet. A turn back 2 of proper depth is provided at one end of the packing sheet 1 and one end of the laver 3 is inserted therein to fix itself. Said turn back 2 may be formed by doubling the packing sheet 1. The upper edge 4 or the lower edge 5 or both of them may be joined together. Also, a turn back end 6 may be cut through, putting together the upper edge 4 and the lower edge 5.

Figure 3:
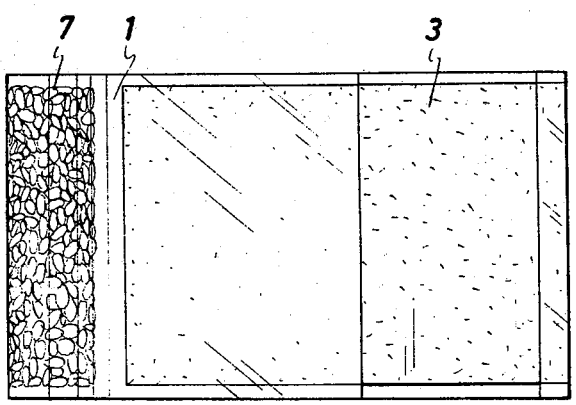
FIG. 3 is a plan view in which a packing sheet is folded back.
Figure 4:
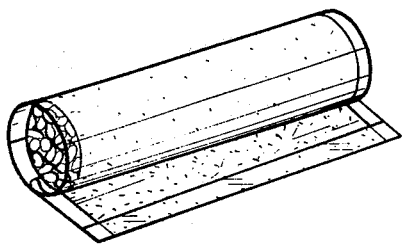
FIG. 4 is a perspective view illustrating seasoned rice rolled in laver which is completely packed according to the invention.

Seasoned rice 7 of cylindrical shape is situated at the center of said packing sheet 1 at right angles to the longitudinal direction of said packing sheet 1. And then, as shown in FIG. 3, the packing sheet 1 is folded back so as to prevent the direct contact of laver 3 and the seasoned rice 7. As shown in FIG. 4, both the laver 3 and the seasoned rice 7 are packed separately by the packing sheet 1 and the adhesive tape (not shown) is attached to complete the packaging.

In order to eat the seasoned rice rolled in laver which has been packed in such a way, the adhesive tape should be taken off. Pulling one end of the folded packing sheet 1 cause unpacking as well as rolling the seasoned rice 7 on the laver 3 and finally both of them are combined in a body. Namely, stripping the packing sheet 1 and attaching the laver 3 on the seasoned rice 7 take place side by side to produce seasoned rice rolled in laver.

Following effects can be obtained by seasoned rice rolled in laver according to the present invention.

In the first place, the flavour of laver is not damaged by the moisture of seasoned rice, because the laver and the seasoned rice are packed separately by the packing sheet. Accordingly, the dried and good smelling laver can be appreciated.

In the second place, the seasoned rice rolled in laver can be surely and cleanly packed for selling them at a drive-in store or at a station.

In the third place, it is very convenient to make seasoned rice rolled in laver, simply by unpacking the sheet and rolling the seasoned rice on the laver.

While there have been shown and described and pointed out the fundamental novel features of the invention as applied to preferred embodiments. It will be understood that the various omissions and substitutions and changes in the form and details of the mechanism illustrated and its operation may be made by those skilled in the art without departing from the spirit of the invention.

What is claimed is:

1. A wrapped seasoned rice ball rolled in laver comprising an elongated moisture-proof sheet having a first and second end, a sheet of laver placed on a portion of said moisture-proof sheet within the borders of said moisture-proof sheet and adjacent the first end of said moisture-proof sheet, a rice-ball placed centrally on said moisture-proof sheet and separated from said sheet of laver, a separate portion of said moisture-proof sheet including the second end of said moisture-proof sheet being folded onto said rice-ball and onto a portion of the top of said sheet of laver to cover same with the rice-ball and laver maintained out of contact with each other and with the covered rice-ball rolled within the moisture-proof sheet to form a cylindrical shape, the seasoned rice ball being substantially completely surrounded by said separate portion of the moisture-proof packing sheet wrapped therearound, and said laver wrapped around the seasoned rice and said separate portion of the moisture-proof packing sheet, wherein said separate portion of said moisture-proof packing sheet is located therebetween maintaining the rice and laver out of physical contact with each other.

2. Seasoned rice rolled in laver construction according to claim 1, wherein a turn back is provided at said first end of the packing sheet and the laver sheet is inserted therein to fix itself.

3. Seasoned rice rolled in laver construction according to claim 2, wherein one of the upper or the lower edges of the turn back is joined together.

4. Seasoned rice rolled in laver construction as claimed in claim 3, wherein the end of said turn is cut through for attaching said laver sheet to said packing sheet.

5. Seasoned rice rolled in laver construction according to claim 2, wherein both the upper and lower edges of the turn back are joined together.

6. Seasoned rice rolled in laver construction according to claim 1, wherein a plastic film is used for the packing sheet.

7. Seasoned rice rolled in laver construction according to claim 6, wherein the plastic film is transparent.

8. A method for storing and forming a laver-covered rice-ball foodstuff comprising the steps of placing an elongated moisture-proof sheet having a first and second end on a flat surface, placing a sheet of laver on a first portion of said moisture-proof sheet to be within the borders of said moisture-proof sheet and adjacent the first end thereof, placing a rice-ball centrally on said moisture-proof sheet separated from said sheet of laver, folding a separate portion of said moisture-proof sheet including the second end of said moisture-proof sheet onto said rice-ball and onto a portion of the top of said sheet of laver to cover same while maintaining the rice-ball and laver out of contact with each other, rolling said covered rice-ball within said moisture-proof sheet to form a cylindrical shape with the moisture-proof sheet rolled within and located between said rice-ball and said sheet of laver, unrolling said rice-ball and said moisture-proof sheet to expose said second end of said moisture-proof sheet lifting said second end of the moisture-proof sheet off said sheet of laver, and pulling said second end of said moisture-proof sheet to roll said rice-ball onto and within said sheet of laver.

9. The method of claim 8, wherein the first end of said elongated moisture-proof sheet is folded onto said laver sheet to form a small edge covering.

* * * * *